United States Patent [19]

Dhami

[11] 4,039,508
[45] Aug. 2, 1977

[54] POLYMERIC COMPOSITION CONTAINING MERCAPTOQUINAZOLONE ANTIOXIDANT

[75] Inventor: Kewal Singh Dhami, Shrewsbury, Mass.

[73] Assignee: International Telephone and Telegraph Corporation, New York, N.Y.

[21] Appl. No.: 725,365

[22] Filed: Sept. 22, 1976

[51] Int. Cl.² ............... C08K 5/34; C07D 239/95
[52] U.S. Cl. .................. 260/45.8 N; 260/251 QA
[58] Field of Search .................. 260/45.8 N, 251 QA

[56] References Cited

U.S. PATENT DOCUMENTS 3,828,042    8/1974    Schlandecker et al. ...... 260/251 QA

OTHER PUBLICATIONS

Journal of Scientific & Industrial Research (India) vol. 15B, No. 12, pp. 690–695 (1956).

Primary Examiner—H.S. Cockeram
Attorney, Agent, or Firm—J. B. Raden; H. J. Holt

[57] ABSTRACT

Polymeric compositions contain as an antioxidant therefor a mercaptoquinazolone of the formula

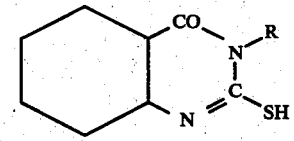

in which R is allyl or methallyl. The antioxidant forms a covalent bond with the polymer upon crosslinking of the latter and thereby antioxidant loss by volatilization or separation is avoided.

5 Claims, No Drawings

POLYMERIC COMPOSITION CONTAINING MERCAPTOQUINAZOLONE ANTIOXIDANT

This invention relates to a polymeric composition containing an antioxidant therefor and to a crosslinked polymeric product formed from said composition.

The use of phenolic, nitrogen, sulfur or phosphorus compounds for stabilization of polymeric plastics or insulation against oxidation is well known. Most such stabilizers or antioxidants have in common the drawback that the compounds do not become an actual part of the polymeric substrate upon chemical or radiation activated crosslinking. The polymeric compositions are thus prone to loss of stabilizer compound due to volatilization at elevated temperatures, they have less resistance than is desirable to solvent extraction and, in some cases, the compounds bloom to the surface of the plastics or insulation.

It is an object of the present invention to provide a compound for the stabilization of polymers against oxidation which is not subject to loss by volatilization, solvent extraction or other separation from the polymer.

It is an additional object to provide an antioxidant compound for polymeric compositions which produces, upon crosslinking of the polymer, a polymeric composition of enhanced stability and improved elevated temperature physical properties.

The foregoing and other objects of the invention are achieved by the incorporation into the polymeric composition of a mercaptoquinazolone compound of the formula

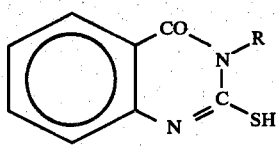

in which R is allyl or methallyl. The compounds of the invention contain an unsaturated moiety (e.g., allyl grouping) as an integral part of the antioxidant molecule. The unsaturated function becomes grafted to the polymeric substrate upon radiation or chemical activated crosslinking of the polymer. As a consequence of its covalent bonding to the polymer, or its self-polymerization, the antioxidant cannot be lost due to volatilization at elevated temperatures or by solvent extraction. In addition, the compounds of the present invention will not bloom to the surface of the plastic or insulation after crosslinking. An additional advantage of the present antioxidant compounds is that unlike other mercapto compounds such as mercaptobenzimidazole, they show no chemical reaction or discoloration when used with other stabilizers, such as lead compounds.

The mercaptoquinazolone compounds are prepared by condensing anthranilic acid with allyl or methallyl mustard oil at 100° to 110° C. A more complete description of the compounds and their preparation may be found in the Journal of Scientific and Industrial Research, (India) Vol. 15B, No. 12, pages 690-695, 1956.

The antioxidant compounds of the invention are useful for the stabilization of a wide variety of hydrocarbon polymers used for the production of insulation. They may be used with such hydrocarbon plastics as polyethylene and polypropylene, with elastomeric polymers such as EPDM rubbers (ethylene-propylene-dicyclopentadiene and other ethylene-propylene-diene terpolymers), SBR rubbers (styrene-butadiene), polybutadiene rubbers, butyl rubbers such as isobutylene-isoprene copolymers, nitrile and polyisoprene rubbers and with other polymers which will occur to those skilled in the art. They are also useful with blends of the foregoing polymers with other polymers and with each other.

The mercaptoquinazolone compounds in certain instances are most effectively used in conjunction with known antioxidants. Their use with, for example, the phenolic antioxidant sold under the trademark "Irganox 1010" has been found to improve the heat aging characteristics of polymeric compositions, considerably beyond the level that would have been expected from the use of either of the antioxidants alone. The proportion of mercaptoquinazolone compound which may be added to the polymers will vary considerably depending upon the particular polymer used and the properties desired in the final crosslinked product. Improved properties are achieved with levels of from 1 to 10 parts by weight per 100 parts by weight of polymer. However, any amount of antioxidant may be used which improves the stability of the polymer, providing of course that the amount is compatible with other polymer properties.

The invention will be better understood in connection with the following examples. All parts are by weight unless otherwise indicated.

EXAMPLE 1

A series of samples of high density polyethylene were prepared from 500 g. formulations, cast into slabs and irradiated to 20 megarad dosage using a 1.5 MEV electron beam accelerator to produce a series of samples of crosslinked products. All of the samples contained the following ingredients:

| | | |
|---|---|---|
| High density polyethylene | 100 | parts |
| Antimony Oxide | 20 | parts |
| TPTMA Crosslinking Agent | 20.8 | parts |

The crosslinking agent was trimethylol propane trimethylacrylate. In addition, the formulations contained the following amounts of the mercaptoquinazolone antioxidant (MAQ) of the invention and/or a known phenolic antioxidant:

| | Sample (parts) | | | | | | |
|---|---|---|---|---|---|---|---|
| | 1 | 2 | 3 | 4 | 5 | 6 | 7 |
| Irganox[1] 1010 | — | 8.4 | 8.4 | 4.2 | 4.2 | — | — |
| MAQ[2] | — | — | 4.2 | 4.2 | 8.4 | 4.2 | 8.4 |

[1] Irganox 1010 is tetrakis (methylene 3-(3'-5'-di-tert-butyl-4'-hydroxyphenyl) propionate) methane.
[2] MAQ is 2-mercapto-3-allyl-3,4-dihyro-quinazoline-4-one.

Samples 1 through 7 were aged at elevated temperatures after irradiation crosslinking and tested for tensile strength (T.S.) and ultimate elongation (El) after cooling to room temperature. The results are set forth in Table I.

TABLE I

Aging at 158 and 175° C, TS (psi) and Elongation (% at 20"/min.)

| | 158° C. Aging Data | 175° C. Aging Data |
|---|---|---|
| Sample 1 | TS/E1 | TS/E1 |
| Original | 2543/158 | 2543/158 |
| After 1 day | 2809/200 | 2546/50 |
| After 5 days | 2612/8 | 2000/8 |
| After 7 days | 2428/12 | 1568/0 |

TABLE I-continued

Aging at 158 and 175° C, TS (psi) and Elongation (% at 20"/min.)

| | 158° C. Aging Data | 175° C. Aging Data |
|---|---|---|
| Sample 2 | | |
| Original | 2712/50 | 2712/50 |
| After 1 day | 2843/291 | 2500/175 |
| After 5 days | 2450/175 | 1661/20 |
| After 7 days | 2684/116 | 1096/0 |
| Sample 3 | | |
| Original | 2567/275 | 2567/275 |
| After 1 day | 2791/308 | 2625/275 |
| After 5 days | 2500/191 | 2458/241 |
| After 7 days | 2806/333 | 1973/25 |
| Sample 4 | | |
| Original | 2875/300 | 2875/300 |
| After 1 day | 2817/266 | 2958/150 |
| After 5 days | 2519/150 | 2402/41 |
| After 7 days | 2817/350 | 2541/25 |
| Sample 5 | | |
| Original | 2666/166 | 2666/166 |
| After 1 day | 2649/216 | 2830/291 |
| After 5 days | 2837/316 | 2458/91 |
| After 7 days | 2806/416 | 2458/91 |
| Sample 6 | | |
| Original | 2850/333 | 2850/333 |
| After 1 day | 2806/266 | 2625/216 |
| After 5 days | 2792/358 | 1910/41 |
| After 7 days | 2698/250 | 1708/12 |
| Sample 7 | | |
| Original | 2719/250 | 2719/250 |
| After 1 day | 2579/208 | 2612/183 |
| After 5 days | 2649/325 | 1875/33 |
| After 7 days | 3069/325 | 1708/8 |

Table I shows that the addition of the mercaptoquinazolone antioxidant, both with and without a known antioxidant, although particularly with the presence of the latter, is an effective antioxidant as shown by the substantial retention of tensile properties on aging at elevated temperatures, as compared with the same polymers without the mercaptoquinazolone antioxidant. The hot modulus values for the seven samples are set forth in Table II.

TABLE II

| Sample | Hot Modulus (% at 200° C./50 psi) |
|---|---|
| 1 | 27 |
| 2 | 38 |
| 3 | 39 |
| 4 | 40 |
| 5 | 30 |
| 6 | 25 |
| 7 | 42 |

Table II shows that the addition of the mercaptoquinazolone antioxidant does not have a deleterious effect on crosslinking.

EXAMPLE II

A series of additional samples were prepared from 500 g. formulations cast into slabs and irradiation crosslinked as in Example 1. The samples all contained the following ingredients:

| | | |
|---|---|---|
| EPDM rubber | 100 | parts |
| High density polyethylene | 100 | parts |
| Antimony Oxide | 50 | parts |
| Clay Filler | 50 | parts |
| Lead Salt Stabilizer | 16.7 | parts |
| Zinc Oxide | 16.7 | parts |
| Plasticizing Oil | 33.3 | parts |
| TPTMA Crosslinking Agent | 16.7 | parts |

In addition, the formulations contained the following amounts of the mercaptoquinazolone antioxidant (MAQ) and/or the phenolic antioxidant:

| | Sample (parts) | | | |
|---|---|---|---|---|
| | 1 | 2 | 3 | 4 |
| Irganox 1010 | 10 | 10 | 5 | — |
| MAQ | — | 5 | 5 | 15 |

Irradiation crosslinked samples 1 through 4 were aged at 175° C. and tested for tensile strength and elongation. Results are set forth in Table III.

TABLE III

Aging at 175° C., T-S & Elongation (%) at 20"/min.

| | T.S. | Elongation |
|---|---|---|
| Sample 1 | | |
| at room temperature | 1798 | 444 |
| 1 day at 175° C. | 1570 | 369 |
| 3 days at 175° C. | 1882 | 400 |
| 5 days at 175° C. | 1300 | 0 |
| Sample 2 | | |
| at rm. temperature | 1900 | 444 |
| 1 day at 175° C. | 1827 | 400 |
| 3 days at 175° C. | 1609 | 325 |
| 5 days at 175° C. | 1758 | 344 |
| 7 days at 175° C. | 1490 | 25 |
| Sample 3 | | |
| at rm. temperature | 1844 | 363 |
| 1 day at 175° C. | 1872 | 363 |
| 3 days at 175° C. | 1980 | 375 |
| 5 days at 175° C. | 1216 | 26 |
| Sample 4 | | |
| at rm. temperature | 1492 | 306 |
| 1 day at 175° C. | 1758 | 338 |
| 3 days at 175° C. | 1458 | 19 |

The hot modulus values for the four samples are set forth in Table IV.

TABLE IV

| Sample | Hot Modulus (% at 200° C./50 psi) |
|---|---|
| 1 | 23 |
| 2 | 19 |
| 3 | 19 |
| 4 | 17 |

It will be seen from Table IV that the presence of the mercaptoquinazolone antioxidant does not impair irradiation crosslinking but rather leads to slight enhancement of crosslinking on radiation activation as shown by the slightly reduced hot modulus values for Samples 2, 3 and 4.

I claim:

1. A polymeric composition containing as an antioxidant therefor an effective amount of a mercaptoquinazolone of the formula

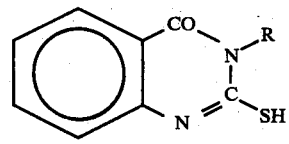

in which R is allyl or methallyl.

2. The composition of claim 1 in which the polymeric composition is polyethylene.

3. The composition of claim 1 in which the polymeric composition is an ethylene-propylene-diene terpolymer rubber.

4. The composition of claim 1 in which R is allyl.

5. A crosslinked polymeric product comprising a polymeric composition and an effective amount of an antioxidant reacted therewith, said antioxidant being a mercaptoquinazolone of the formula

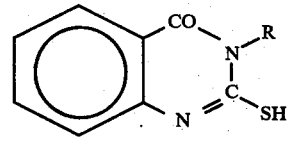

in which R is allyl or methyallyl.

* * * * *